(12) United States Patent
Song et al.

(10) Patent No.: US 9,319,722 B2
(45) Date of Patent: Apr. 19, 2016

(54) METHOD OF PROVIDING MOBILE IPTV SERVICE AND SYSTEM USING THE SAME

(75) Inventors: Hwang Jun Song, Gyeongsangbuk-do (KR); Dong Hyeok Ho, Seoul (KR); Hyun Chul Joo, Gyeongsangbuk-do (KR); Hyung Rai Oh, Seoul (KR); Wan Kim, Gyeongsangbuk-do (KR); Oh Chan Kwon, Gyeongsangbuk-do (KR)

(73) Assignees: POSTECH ACADEMY-INDUSTRY FOUNDATION, Gyeongbuk (KR); SNU R&DB FOUNDATION, Seoul (KR)

( * ) Notice: Subject to any disclaimer, the term of this patent is extended or adjusted under 35 U.S.C. 154(b) by 60 days.

(21) Appl. No.: 14/125,007

(22) PCT Filed: Sep. 10, 2012

(86) PCT No.: PCT/KR2012/007251
§ 371 (c)(1),
(2), (4) Date: Dec. 9, 2013

(87) PCT Pub. No.: WO2013/048031
PCT Pub. Date: Apr. 4, 2013

(65) Prior Publication Data
US 2014/0126456 A1 May 8, 2014

(30) Foreign Application Priority Data
Sep. 28, 2011 (KR) .......................... 10-2011-0098243

(51) Int. Cl.
*H04W 4/00* (2009.01)
*H04N 21/236* (2011.01)
(Continued)

(52) U.S. Cl.
CPC .......... *H04N 21/236* (2013.01); *H04L 65/4038* (2013.01); *H04L 65/602* (2013.01);
(Continued)

(58) Field of Classification Search
None
See application file for complete search history.

(56) References Cited

U.S. PATENT DOCUMENTS 8,010,978 B2 * 8/2011 Park et al. ........................ 725/34
2007/0094683 A1 4/2007 Lee
(Continued)

FOREIGN PATENT DOCUMENTS

| KR | 10-0686152 B1 | 2/2007 |
|---|---|---|
| KR | 10-2008-0061583 | 7/2008 |
| KR | 10-2008-0097863 A | 11/2008 |

OTHER PUBLICATIONS

International Search Report for corresponding International Application No. PCT/KR2012/007251, mailed Jan. 2, 2013 (4 pages)
(Continued)

*Primary Examiner* — Phirin Sam
(74) *Attorney, Agent, or Firm* — Osha Liang LLP

(57) ABSTRACT

The method of providing a mobile IPTV service, performed in a terminal that receives streams of all channels belonging to a channel group of a currently viewed channel, includes, when a channel is selected, determining whether the selected channel and the currently viewed channel belong to the same channel group, and when the selected channel and the currently viewed channel are determined to belong to the same channel group, decoding, by the terminal, an IPTV channel stream of the selected channel within a currently received channel. Therefore, since the channel group is generated based on channel selection preference, and a multicast stream including a channel stream of the channel group is broadcast, it is possible to decrease average processing complexity and to guarantee rapid channel change when a user changes the channel to another channel in the same channel group.

9 Claims, 3 Drawing Sheets

(51) Int. Cl.
  *H04N 21/6405* (2011.01)
  *H04N 21/414* (2011.01)
  *H04N 21/438* (2011.01)
  *H04N 21/2385* (2011.01)
  *H04W 4/06* (2009.01)
  *H04L 29/06* (2006.01)

(52) U.S. Cl.
  CPC ..... *H04N21/2385* (2013.01); *H04N 21/41407* (2013.01); *H04N 21/4384* (2013.01); *H04N 21/6405* (2013.01); *H04W 4/06* (2013.01)

(56) References Cited

U.S. PATENT DOCUMENTS

| | | | |
|---|---|---|---|
| 2009/0319869 A1* | 12/2009 | Read | 714/763 |
| 2010/0037266 A1* | 2/2010 | Rahman | 725/56 |
| 2010/0146567 A1* | 6/2010 | Mehta et al. | 725/91 |
| 2011/0103374 A1* | 5/2011 | Lajoie et al. | 370/352 |
| 2011/0134790 A1* | 6/2011 | Jiang | 370/252 |

OTHER PUBLICATIONS

Written Opinion for corresponding International Application No. PCT/KR2012/007251, mailed Jan. 2, 2013 (5 pages).

\* cited by examiner

METHOD OF PROVIDING MOBILE IPTV SERVICE AND SYSTEM USING THE SAME

CLAIM FOR PRIORITY

This application claims priority to Korean Patent Application No. 2011-0098243 filed on Sep. 28, 2011 in the Korean Intellectual Property Office (KIPO), the entire contents of which are hereby incorporated by reference.

BACKGROUND

1. Technical Field

Example embodiments of the present invention relate to a method of providing a mobile IPTV service, and more specifically, to a method of providing a mobile IPTV service that determines a channel group of a requested channel and provides a multicast stream that includes a channel stream of the channel and a channel stream of the determined channel group to a mobile terminal, and a system using the same.

2. Related Art

Due to development of broadband wireless network technology, seamless high-speed wireless communication services are available in a mobile environment anytime and anyplace. Specifically, users' needs for high-quality multimedia streaming services such as an IPTV service in wired and wireless network environments have been increasing in recent years.

Since an existing IPTV uses a method in which a variety of pieces of IP-based content are transmitted to the user via an IP network, a wireless environment is necessary for the user to extend the existing IPTV to a mobile IPTV. Wireless technology is not limited to particular technology, but an early stage of mobile IPTV technology that provides an IPTV service using broadband wireless access technology, a WiMAX network, has been under development in recent years.

Due to recent development of video coding schemes and spread of broadband networks, there is now great interest and demand among users for a variety of multimedia services via the Internet. In particular, IPTV service is a main application in the IT market, and as wireless devices and wireless networks grow, it is expected to be extended to mobile IPTV service in the near future. As a representative wireless network capable of providing mobile IPTV service, the WiMAX network, which can provide a high data transmission rate, service-specific quality of service (QoS), and multicast and broadcast service (MBS), has entered the spotlight.

The WiMAX network provides a high data rate in the wireless network but has lower performance than the wired network. Moreover, it is expected that more bandwidth will be required for a base station (BS) to support a variety of multimedia services over the wireless network. Accordingly, a mobile IPTV system needs to be designed to efficiently manage channel stream resources over the WiMAX network.

Furthermore, in a mobile IPTV multicast system, a relatively longer channel change delay than in an existing broadcasting service is a big challenge for the IPTV service extension and needs to be addressed.

SUMMARY

Accordingly, example embodiments of the present invention are provided to substantially obviate one or more problems due to limitations and disadvantages of the related art.

Example embodiments of the present invention provide a method of providing a mobile IPTV service, and more specifically, to a method of providing a mobile IPTV service that determines a channel group of a requested channel and provides a multicast stream that includes a channel stream of the channel and a channel stream of the determined channel group to a mobile terminal, and a system using the same.

In some example embodiments, a method of providing a mobile IPTV service that is performed in a mobile IPTV service providing server, includes determining, when a channel is requested from a terminal, a channel group to which the requested channel belongs, generating a multicast stream including a channel stream of the requested channel and channel streams of other channels belonging to the determined channel group, and encoding the multicast stream and transmitting the result to the terminal.

In other example embodiments, a method of providing a mobile IPTV service, performed in a terminal that receives streams of all channels belonging to a channel group of a currently viewed channel, includes determining, when a channel is selected, whether the selected channel and the currently viewed channel belong to the same channel group, and when the selected channel and the currently viewed channel are determined to belong to the same channel group, decoding, by the terminal, an IPTV channel stream of the selected channel from the stream of a currently received channel

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
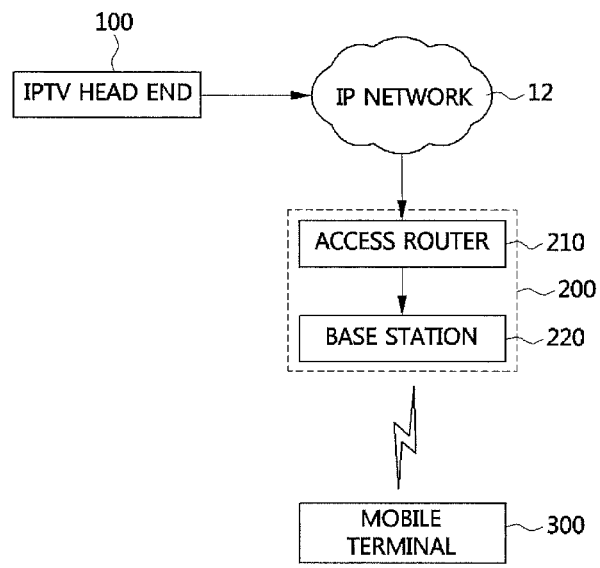
FIG. 1 is a conceptual diagram illustrating a system for providing a mobile IPTV service according to an embodiment of the invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In this specification, embodiments of the invention mainly describe data transmission and reception between a base station and a terminal. Here, the base station means a terminal node in a network that directly communicates with the terminal. A specific operation described as being performed by the base station in this specification may be performed by an upper node of the base station in some cases.

That is, in a network composed of a plurality of network nodes including the base station, various operations to communicate with the terminal may be performed by the base station or a node other than the base station. In this case, the term 'base station' may be replaced with, for example, a fixed station, a Node B, an eNode B (eNB), and an access point. Moreover, the term 'mobile station (MS)' may be replaced with, for example, user equipment (UE), a subscriber station (SS), a mobile subscriber station (MSS), and a mobile terminal.

A transmitter refers to a node for transmitting data or voice services, and a receiver refers to a node for receiving data or voice services. Accordingly, in uplink, the terminal serves as the transmitter and the base station serves as the receiver. Similarly, in downlink, the terminal serves as the receiver and the base station serves as the transmitter.

Examples of the terminal of the invention may include a personal digital assistant (PDA), a cellular phone, a personal communication service (PCS) phone, a global system for mobile communications (GSM) phone, a wideband CDMA (WCDMA) phone, and a mobile broadband system (MBS) phone.

Embodiments of the invention may be implemented by a variety of methods. For example, embodiments of the invention may be implemented by hardware, firmware, software, and a combination thereof. In the case of hardware implementation, a method according to embodiments of the invention may be implemented by at least one of application-specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

Hereinafter, exemplary embodiments of the invention will be described below in detail with reference to the accompanying drawings.

FIG. 1 is a conceptual diagram illustrating a system for providing a mobile IPTV service according to an embodiment of the invention.

As illustrated in FIG. 1, the mobile IPTV system may include an IPTV head end 100, an IP network 12, an access network 200, and a mobile terminal 300.

The IPTV head end 100 receives a broadcasting channel from a broadcasting system having the same zone as a cable, satellite, or terrestrial broadcasting network, and transmits the broadcasting channel received over the IP network 12 to the access network 200, for example, a WiMAX network. The base station 220 uses several combinations of available modulation schemes and coding rates to transmit a multicast stream. The combinations of modulation schemes and coding rates are numbered from 1 to $MC_{MAX}$ in order of robustness to wireless channel errors, and are named 'mc.' Examples of mc are given in Table 1.

TABLE 1

| mc | Modulation, Overall coding rate | $R_{slot}$(mc) |
|---|---|---|
| 1 | 64QAM, 3/4 | 216 |
| 2 | 64QAM, 2/3 | 192 |
| 3 | 16QAM, 3/4 | 144 |
| 4 | 16QAM, 1/2 | 72 |
| 5 | QPSK, 3/4 | 72 |
| 6 ($MC_{Max}$) | QPSK, 1/2 | 48 |

$R_{slot}$(mc) represents the number of data bits transmitted per slot on a physical layer and is calculated as Formula 1.

$$R_{slot}(mc)=24*2*M_{mc}*C_{mc} \quad \text{Formula 1}$$

In Formula 1, $M_{mc}$ and $C_{mc}$ respectively represent the number of bits per symbol and coding rate. For example, when the modulation scheme is QPSK and the coding rate is 3/4, the number of data bits transmitted per slot, that is, $R_{slot}$(mc), is 72.

The mobile terminal 300 supports WiMAX and is connected to the access network 200 to receive the multicast stream transmitted from the base station 220 of the access network 200.

Figure 2:
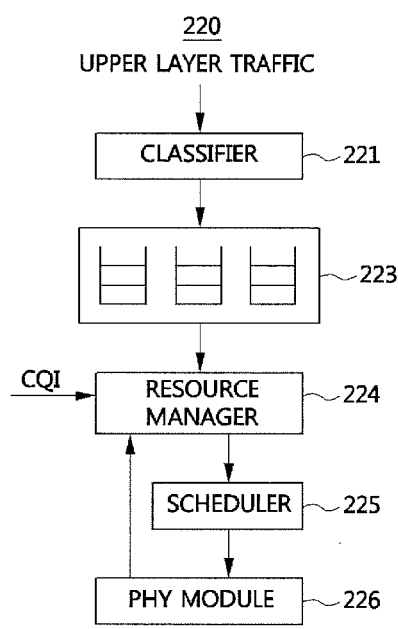
FIG. 2 is a block diagram illustrating components of a base station in FIG. 1.

FIG. 2 is a block diagram illustrating components of the base station in the mobile IPTV system according to the embodiment of the invention.

In the embodiment in FIG. 2, the base station 220 may divide the multicast stream into at least one source block, apply a fountain code to a source symbol in the source block, and then encode the stream according to the modulation scheme and coding rate determined based on a wireless link state, insert a fountain encoding symbol into a packet, and transmit the result to the mobile terminal 300.

In this case, the wireless link state is determined by a radio condition, for example, receiving power, fading, and interference. The wireless link state is transmitted to the base station 220 using channel quality indicator (CQI) information of the mobile terminal 300.

For this purpose, the base station 220 may include a classifier 221, a buffer 223, a resource manager 224, a scheduler 225, and a PHY module 226.

The classifier 221 receives upper layer traffic, classifies an IPTV multicast stream from the received upper layer traffic, and then stores the stream in the buffer 223. In this case, the classifier 221 assigns a multicast connection ID (MCID) to the IPTV multicast stream and then stores the stream in each buffer 223.

The resource manager 224 receives a channel quality indicator (CQI) in an upstream subframe transmitted from the mobile terminal 300 and updates a minimum signal-to-noise ratio, $SNR_{min}$, based on the CQI. Here, $SNR_{min}$, refers to a minimum value among signal-to-noise ratio of terminals which receive the IPTV multicast stream.

The resource manager 224 may identify link states of users in a cell based on $SNR_{min}$ and determine the modulation scheme and coding rate, accordingly.

More specifically, in order to minimize resource usage of the WiMAX network in Formula 2 while maintaining a decoding failure rate of the fountain code in Formula 3, the resource manager 224 determines the modulation scheme and coding rate for transmitting the multicast stream, and the number of packets to be used for transmitting the multicast stream.

$$\left\lceil \frac{n_{pkt} \cdot (R_{packet} + R_{overhead})}{R_{slot}(mc)} \right\rceil \qquad \text{Formula 2}$$

$$\text{subject to } P_{dec\_fail}(n_{pkt}, mc, SNR_{min}) \leq P^{max}_{dec\_fail} \qquad \text{Formula 3}$$

In Formulas 2 and 3, Formula 2 expresses slot usage for transmitting the IPTV multicast stream in the WiMAX network, and Formula 3 expresses decoding failure rate constraints. Here, mc represents a modulation scheme and a coding rate, $n_{pkt}$ represents the number of packets to be used for transmitting the multicast stream, $P^{max}_{dex\_fail}$ represents a decoding failure rate without disturbing normal reproduction, $R_{packet}$ represents a packet size in an upper layer, and $R_{overhead}$ represents an additional overhead to transmit a packet in a media access control (MAC) layer.

Hereinafter, the resource manager 224 may narrow down the scope of determining the modulation scheme, the coding rate, and the number of packets to be used for transmitting the multicast stream using the following definition.

First, when mc and $SNR_{min}$ are given, $n^*_{pkt}$ (mc, $SNR_{min}$) is set to a minimum value in $n_{pkt}$ satisfying the decoding failure rate, as exemplified in Formula 4.

$$n^*_{pkt}(mc, SNR_{min}) = \qquad \text{Formula 4}$$

$$\operatorname*{argmin}_{n_{pkt}} d(n_{pkt}, mc, SNR_{min}) \text{ for } \left\lceil \frac{(1+\gamma)K}{N_{symbol}} \right\rceil \leq n_{pkt} \leq \left\lceil \frac{K \cdot C}{N_{symbol}} \right\rceil$$

where, $$d(n_{pkt}, mc, SNR_{min}) = \begin{cases} P^{max}_{dec\_fail} - P_{dec\_fail}(n_{pkt}, mc, SNR_{min}) \\ \quad : \text{if } P_{dec\_fail}(n_{pkt}, mc, SNR_{min}) \leq P^{max}_{dec\_fail} \\ \infty : \text{otherwise} \end{cases}$$

In Formula 4, mc represents the modulation scheme and coding rate, $n_{pkt}$ represents the number of packets to be used for transmitting the multicast stream, $N_{Symbol}$ represents the number of encoding symbols per packet, C represents a target coding rate of the fountain code, $P^{max}_{dec\_fail}$ represents a decoding failure rate without disturbing normal reproduction, and $P_{dec\_fail}(n_{pkt}, mc, SNR_{min})$ represents the decoding failure rate of the fountain code for transmitting the multicast stream.

Second, as the coding rate of the modulation scheme increases, the number of packets transmitted to satisfy the decoding failure rate increases. When $mc_i > mc_j$ is satisfied, $n^*_{pkt}(mc_i, SNR_{min}) \leq n^*_{pkt}(mc_j, SNR_{min})$. That is, since $mc_i$ has a higher coding rate of the modulation scheme than $mc_j$, mci has a larger number of packets transmitted to satisfy the decoding failure rate than $mc_j$, due to the high coding rate. Here, Formula 4 may be expressed as Formula 5.

$$n^*_{pkt}(mc_j, SNR_{min}) = \qquad \text{Formula 5}$$

$$\operatorname*{argmin}_{n_{pkt}} d(n_{pkt}, mc_j, SNR_{min}) \text{ for } n^*_{pkt}(mc_i, SNR_{min}) \leq$$

$$n_{pkt} \leq \left\lceil \frac{K \cdot C}{N_{symbol}} \right\rceil$$

In this way, when mc is determined, the resource manager 224 may narrow down the search scope of $n_{pkt}$ using the above-described method, and thereby complexity may be reduced by $O(\lceil K \cdot C/N_{symbol} \rceil - \lceil (1+\gamma)K/N_{symbol} \rceil + 1)$.

When the multicast stream is received from the resource manager 224, the scheduler 225 divides the multicast stream into a plurality of source blocks, applies the fountain code to the source symbol in the source blocks, encodes the stream according to the modulation scheme and coding rate determined by the resource manager 224, and transmits the result to the mobile terminal 300. For this purpose, the scheduler 225 reserves an MBS zone in a downlink subframe for transmitting $n_{pkt}$ packets determined by mc selected in a protection time window through the PHY module 226. When the multicast stream is received from the resource manager 224, the scheduler 225 encodes the multicast stream according to the modulation scheme and coding rate determined by the resource manager 224 and transmits the result to the mobile terminal 300 through the MBS zone.

Figure 3:
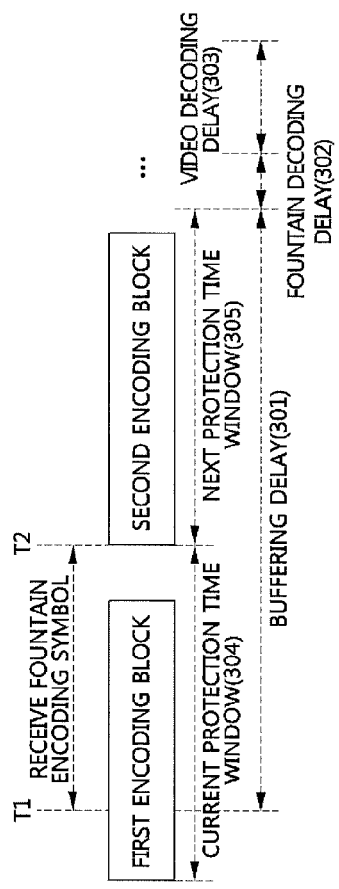
FIG. 3 is a diagram illustrating an example of a delay in order for the base station in FIG. 1 to transmit a channel stream corresponding to a request from a terminal.

FIG. 3 is a diagram illustrating an example of a delay in order for the base station in FIG. 1 to transmit a channel stream corresponding to a request from the terminal.

In the embodiment in FIG. 3, the base station 220 receives a channel change request from the mobile terminal 300 and transmits the channel stream corresponding to the requested channel. In this case, in order to transmit the channel stream corresponding to the requested channel, a channel change delay occurs in the base station 220.

As illustrated in FIG. 3, the channel change delay is a delay due to a buffering delay 301, a fountain decoding delay 302, and a video decoding delay 303. The buffering delay 301 refers to a period between a time at which the mobile terminal 300 receives a fountain encoding symbol from the base station 220 in order to reproduce the received channel stream and a time at which the sufficient number of fountain encoding symbols to perform fountain decoding is received. In this case, packets required for reproducing the channel stream are received in units of protection time windows.

The mobile terminal 300 receives the fountain encoding symbol from the base station 220 between time T1 at which the channel change is requested in a current protection time window 304 and time T2 at which a next protection time window 305 starts, and stores the symbol in the buffer. However, when the number of received fountain encoding symbols is not sufficient to perform the fountain decoding, the fountain encoding symbol stored in the buffer is deleted to receive the fountain encoding symbol of the next protection time window 305.

When the fountain encoding symbol stored in the buffer is not deleted, the mobile terminal 300 performs the fountain decoding of the fountain encoding symbol stored in the buffer after a certain fountain decoding delay time has elapsed and obtains the source symbol.

The fountain decoding delay 302 refers to a period between a time at which the mobile terminal 300 receives the fountain encoding symbol from the base station 220 and then stores the symbol in the buffer and a time at which the fountain encoding symbol stored in the buffer is decoded and the source symbol is obtained.

The video decoding delay 303 is a decoding delay due to a GOP structure. The video decoding delay 303 occurs when the fountain encoding symbol corresponding to a specific frame is decoded first as opposed to sequentially decoding the fountain encoding symbol, in order for the mobile terminal 300 to reproduce the channel stream received from the base station 220.

For example, the delay occurs when the base station 220 divides the channel stream into the source block in units of GOPs, applies the fountain code to the source symbol in the source block, encodes the stream, and transmits the result to the mobile terminal 300, and the mobile terminal 300 firstly performs decoding of the fountain encoding symbol corresponding to I picture that can obtain an original screen by independently decoding those among the fountain encoding symbols received from the base station 220 within the screen. Hereinafter, an example of channel grouping in order to decrease the channel change delay will be described.

Figure 4:
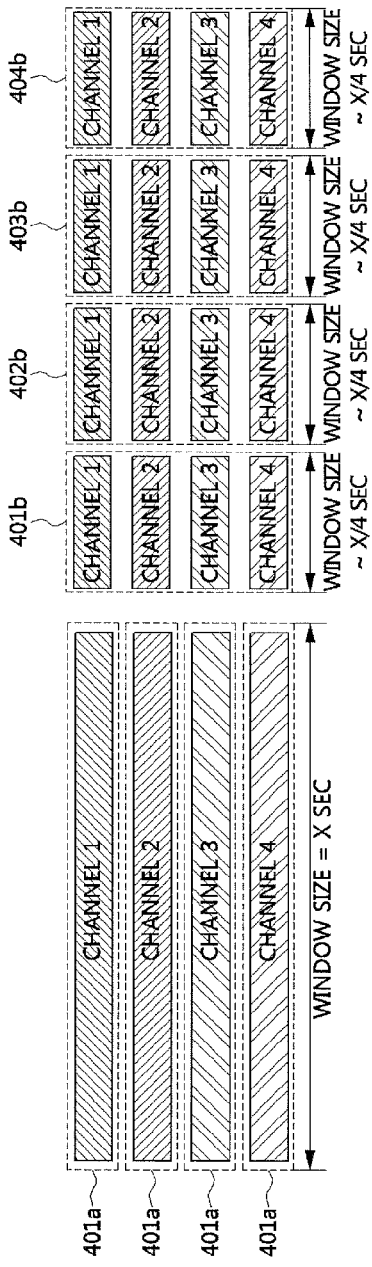
FIG. 4 is a diagram illustrating an example of channel groupings in the base station in FIG. 1.

FIG. 4 is a diagram illustrating an example of channel groupings in the base station in FIG. 1.

FIG. 4A is a diagram illustrating an example of grouping in the mobile IPTV system according to the embodiment of the invention such that the base station allows one channel to be included in one channel group. FIG. 4B is a diagram illustrating an example of grouping in the mobile IPTV system according to the embodiment of the invention such that the base station allows a plurality of channels to be included in one channel group.

In FIG. 4A, the protection time window, which is the unit in which packets required for reproducing the IPTV channel stream are received, is t seconds. However, in FIG. 4B, since four channels are included in one channel group, the protection time window, which is the unit in which packets required for reproducing the IPTV channel stream in each channel are received, is x/4 seconds.

That is, in FIG. 4A, since only the IPTV channel stream corresponding to one channel is transmitted to the mobile terminal 300, the mobile terminal 300 needs to request a channel change from base station 220 in order to change the channel from a currently viewed channel to another channel. However, in FIG. 4B, when channels are grouped by channel 1 401*b* to channel 4 404*b*, since the mobile terminal 300 receives a broadcast multicast stream including the IPTV channel stream corresponding to the currently viewed channel and the channel belonging to the same channel group as the currently viewed channel, it is possible to immediately change the channel when the mobile terminal 300 wants to change the channel to another channel in the same channel group.

For example, when the mobile terminal 300 views channel 1 belonging to a second group 402 in FIG. 4B, since the base station 220 simultaneously broadcasts to the mobile terminal 300 channel streams of channel 1 401 to channel 4 404 corresponding to the second group 402 to which the currently viewed channel of the mobile terminal 300 belongs, the mobile terminal 300 can immediately change the channel without a channel change delay when the channel is changed from 1 to 3.

Figure 5:
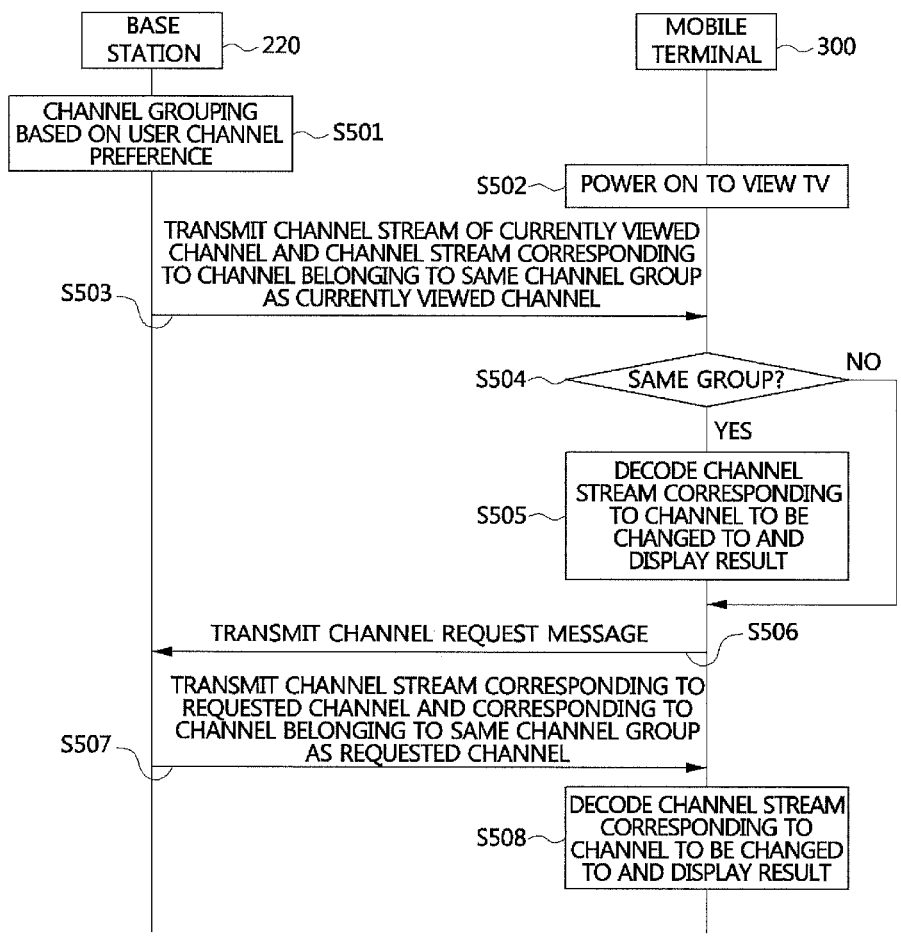
FIG. 5 is a flowchart illustrating transmission and reception of a multicast stream between the base station and the terminal in FIG. 1.

FIG. 5 is a flowchart illustrating transmission and reception of the multicast stream between the base station and the terminal in FIG. 1.

As illustrated in FIG. 5, the base station 220 performs channel grouping according to channel preferences of a user (S501). When the mobile terminal 300 is turned on for viewing a specific broadcast program by the user (S502), the base station 220 determines a channel group to which the channel requested from the mobile terminal 300 belongs, and broadcasts the multicast stream that includes the channel stream of the requested channel and the channel stream of other channels belonging to the determined channel group to the mobile terminal 300 (S503).

The mobile terminal 300 receives the multicast stream from the base station 220, decodes the channel stream corresponding to the currently viewed channel, and displays the stream. When a command for changing the channel from the currently viewed channel to another channel is received from the user, the mobile terminal 300 determines whether the currently viewed channel and the channel to be changed to belong to the same channel group (S504).

Here, when a button for changing a channel is prepared in advance and the user pushes the specific button, the mobile terminal 300 receives a signal corresponding to the pushed button and determines whether the button corresponding to the received signal is the button for changing a channel. When the pushed button is determined as the button for changing a channel, the mobile terminal 300 determines whether the currently viewed channel and the channel to be changed to belong to the same group in order to change the channel from the currently viewed channel to the other channel.

When the currently viewed channel and the channel to be changed to are determined to belong to the same channel group, the mobile terminal 300 performs decoding of the channel stream corresponding to the channel to be changed to in a received channel stream and displays the result (S505). In this way, since the mobile terminal 300 simultaneously receives the channel stream corresponding to the channel belonging to the same channel group, it is possible to immediately change the channel when the channel is changed to another channel in the same channel group.

On the other hand, when the currently viewed channel and the channel to be changed to are determined to not belong to the same channel group, mobile terminal 300 transmit a request message including channel information to the base station 220. Therefore, since the base station 220 searches for a channel stream corresponding to the channel requested from the mobile terminal 300, and then transmits the stream to the mobile terminal 300, the channel change delay occurs in the base station 220. The channel change delay will be described in detail below with reference to FIG. 3.

The base station 220 broadcasts a multicast stream that includes a channel stream corresponding to the channel to be changed to received from the mobile terminal 300 and a channel stream belonging to the same channel group to the mobile terminal 300 (S507).

Here, the base station 220 performs encoding of the multicast stream according to a transmission rate adjusted based on the wireless link state of the mobile terminal 300 obtained using the channel quality indicator (CQI) information of the mobile terminal 300, and then broadcasts the stream to the mobile terminal 300.

The mobile terminal 300 decodes the channel stream corresponding to the channel to be changed to by receiving the multicast stream from the base station 220 and displays the stream (S508).

While the present invention has been described with reference to exemplary embodiments, it will be understood by those skilled in the art that various changes and modifications may be made without departing from the spirit and scope of the present invention as defined by the appended claims.

According to the method of providing mobile IPTV service and the system using the same according to the invention described above, since the channel group of the requested channel is determined, and the multicast stream that includes a channel stream of the channel and a channel stream of the determined channel group is broadcast to the mobile terminal, it is possible to decrease average processing complexity and to guarantee rapid channel change when the channel is changed to another channel in the same channel group in the mobile terminal.

While the example embodiments of the present invention and their advantages have been described in detail, it should be understood that various changes, substitutions and alterations may be made herein without departing from the scope of the invention as defined by the following claims.

| Reference Numerals | |
| --- | --- |
| 100: IPTV head end | 12: IP network |
| 200: access network | 210: access router |
| 220: base station | 221: classifier |
| 223: buffer | 224: resource manager |
| 225: scheduler | 226: PHY module |
| 300: mobile terminal | |

What is claimed is:

1. A method of providing a mobile IPTV service that is performed in a mobile IPTV service providing server, the method comprising:

when a channel is requested from a terminal, determining a channel group to which the requested channel belongs;

generating a multicast stream including a channel stream of the requested channel and channel streams of other channels belonging to the determined channel group; and encoding the multicast stream and transmitting the stream to the terminal, wherein the terminal changes the requested channel to another channel by determining whether the requested channel and a currently viewed channel belong to the same channel group.

2. The method of claim 1, wherein the channel group is generated by classifying IPTV channels into at least one group based on predetermined criteria.

3. The method of claim 1, wherein the encoding is performed such that the multicast stream is divided into a plurality of source blocks, a fountain code is applied to a source symbol in the source blocks, and the encoding is performed in units of the source blocks.

4. A method of providing a mobile IPTV service, performed in a terminal that receives streams of all channels belonging to a channel group of a currently viewed channel, the method comprising:

when a channel is selected, determining whether the selected channel and the currently viewed channel belong to the same channel group; and when the selected channel and the currently viewed channel are determined to belong to the same channel group, decoding, by the terminal, an IPTV channel stream of the selected channel within a currently received channel, wherein the terminal changes the selected channel to another channel by determining whether the selected channel and the currently viewed channel belong to the same channel group.

5. The method of claim 4, further comprising, when the selected channel and the currently viewed channel are determined to not belong to the same channel group, requesting a service for the selected channel from a mobile IPTV service providing server.

6. The method of claim 4, further comprising receiving a multicast stream that includes the IPTV channel stream of the selected channel and IPTV channel streams of other channels belonging to the same channel group as the selected channel, from a mobile IPTV service providing server.

7. The method of claim 4, wherein the IPTV channel stream is divided into a plurality of source blocks, a fountain code is applied to a source symbol in the divided source blocks, and encoding of the source symbol is performed in units of the source blocks.

8. The method of claim 4, wherein the IPTV channel stream is decoded after a required number of encoded source symbols to perform decoding is received from a base station.

9. The method of claim 8, wherein the required number for decoding decreases in proportion to the number of IPTV channel streams belonging to the channel group.

* * * * *